United States Patent Office 3,709,866
Patented Jan. 9, 1973

3,709,866
PHOTOPOLYMERIZABLE DENTAL PRODUCTS
Duncan E. Waller, Milford, Del., assignor to
Dentsply International Inc., York, Pa.
No Drawing. Continuation-in-part of application Ser. No. 836,650, June 25, 1969. This application June 1, 1970, Ser. No. 42,466
The portion of the term of the patent subsequent to Dec. 21, 1988, has been disclaimed
Int. Cl. C09j 3/26
U.S. Cl. 260—27 R    19 Claims

ABSTRACT OF THE DISCLOSURE

Photopolymerizable dental products are provided in the form of compositions suitable as composite restorative materials, fissure sealants, cements, cavity liners and restoration glazes, the compositions being capable of being photopolymerized in situ, within the oral environment, by the application of light energy, specifically light energy in the near ultraviolet wave length band. Such a composition is made in two parts, i.e., paste-paste, paste-liquid, jelly-powder, liquid-liquid, etc., wherein one phase contains an aromatic dimethacrylate monomer or adduct thereof with a mono- or diisocyanate, a diluent monomer and a polymerization inhibitor, while the other phase contains a material sensitive to ultraviolet light and capable of initiating free radical polymerization when excited thereby. Optionally, the paste phases may contain fillers which are characterized by having a refractive index no greater than 0.075 different from that of the polymer resulting from the free radical polymerization.

---

This application is a continuation-in-part of copending application Ser. No. 836,650, filed June 25, 1969, now Pat. No. 3,629,187 in the name of Duncan E. Waller.

The present invention is directed to novel dental compositions including those useful as composite restorative materials, fissure sealants, cements, cavity liners and restoration glazes, etc., wherein such dental compositions are capable of being photopolymerized in situ within the oral environment; more particularly, the present invention is directed to certain novel dental compositions taking a variety of forms, but based upon a polymerizable aromatic dimethacrylate or adduct thereof with a mono- or diisocyanate, such dental compositions being capable of photopolymerization through the application of light energy, specifically light energy in the near ultraviolet wave length band.

It is, of course, well known that in recent years polymerizable plastic materials have come to the forefront in their use in various dental compositions and products, including, among others, composite restorative materials, dental cements, dental cavity liners, etc. Thus, while various conventional amalgam materials and cements based upon silicates are still widely used in various dental applications, there is an ever increasing employment of plastics, and particularly composites of plastics and various refractory fillers. Accordingly, the dental field is always and continuously looking for new plastics which can improve the physical characteristics of various dental products and compositions.

The use of synthetic plastics is particularly prominent in composite dental restorative materials. In this regard, by definition a restorative material must restore the appearance, as well as the function of a defective tooth crown so that a number of restrictions are generally placed upon suitable materials. First of all, the material used should have a light yellow color and should be translucent so as to match the tooth color and translucency as much as possible. This, of course, rules out metals and highly opaque materials but allows for the advantageous utilization of a number of plastic materials.

In addition, to restore the normal function of the defective tooth crown, the materials employed in the dental restorative material must compare favorably with the natural tooth crown in strength, stiffness and dimensional stability. During mastication, strength and stiffness maintain the integrity of the material and support the remaining tooth structure. This, accordingly, rules out soft rubbery materials. Similarly, the requirement for adequate dimensional stability precludes materials that are appreciably soluble in the aqueous environment of the mouth and materials that are abraded more readily than dental enamel. This, accordingly, rules out silicate and zinc phosphate cements which because of their solubility and low strength cannot restore the function of teeth for long periods.

Additionally, it has been previously found that unreinforced organic polymers or plastic materials are generally not satisfactory as restorative materials. Thus, the failure of such organic polymers or plastics to serve as reliable restorative materials over extended periods of time appears to be related, at least in part, to the shrinkage characteristics of such materials and their lack of effective abrasion resistance.

Accordingly, as previously noted, with respect to restorative materials as well as other dental applications, e.g., dental cements, etc., there has been a great deal of reliance on filled plastic materials, that is, organic polymers or plastics containing a particulate filler, e.g., a refractory filler.

With respect to the requirements of the organic polymer or plastic binder employed in such composite dental products, mention is made of the need for rapid and complete polymerization under the conditions existing in the oral environment, low shrinkage during polymerization, low water absorption, low toxicity and satisfactory strength characteristics.

Copending application Ser. No. 836,650 describes a class of materials which have been found to be particularly suitable for polymerization in the oral environment. Thus, as described in such copending application, such a class of materials comprises monomers which contain a polymerizable methacrylate group on each end of a long connecting segment, containing an aromatic group or groups, and preferably represented by 2,2-propane bis[3(4-phenoxy)-1,2-hydroxy propane-1-methacrylate]. Such monomers, additionally employed as adducts of the same with an organic isocyanate or diisocyanate were found to be particularly suitable and adaptable for use in the oral environment in that they show rapid and complete polymerization under the conditions existing in the oral environment, low shrinkage during polymerization, low water absorption, low toxicity and extremely satisfactory strength characteristics. Accordingly, the aforedescribed copending application illustrates the use of such materials in dental compositions including composite dental restorative materials, dental cements, dental lacquers and cavity liners.

It has now been discovered in accordance with the present invention that by using the above and similar monomer materials, it is possible to provide various photopolymerizable compositions whereby the monomeric materials are capable of being photopolymerized in situ within the oral environment. In this regard, the compositions of the present invention have the ability to be photopolymerized when placed within the human mouth by controlled application of essentially harmless energy of selected wave lengths in the near ultraviolet region, to which both soft and hard human tissues display excellent tolerance.

One of the chief disadvantages of conventional cold-cured dental materials is the fact that both manipulation time and setting time of the polymerizable materials are fixed and dependent upon a vast number of parameters, including among others catalyst types and concentrations, mixing temperature, shelf deterioration, inhibitor types and concentrations, monomer reactivity and polymerization exotherm, nature and particle size of filler, if present, and thermal conductivity of the tooth.

With photopolymerizable compositions as in accordance with the present invention, both the manipulation time and setting time can be controlled substantially at will by the operator, allowing the operator time for optimum placement techniques and any necessary adjustments required due to adverse movements of the patient which affect the placement. Accordingly, such photopolymerizable compositions provide the operator with a degree of freedom and ease of usage heretofore unknown, the operator being able to use any time necessary to place or apply the dental compositions and then effect their cure when desired.

The above advantages with respect to ease of operation are, of course, associated with the fact that polymerization of the photopolymerizable compositions is not initiated until the composition is subjected to light energy of the necessary wave length and intensity to excite the photopolymerizable sensitizer, thereby initiating free radical polymerization. This, of course, can be controlled at will by the operator, thereby allowing a greater freedom and ease of usage of photopolymerizable dental compositions.

In accordance with the present invention, a novel class of photopolymerizable dental compositions has been developed in the form of paste-paste systems, paste-liquid systems, jelly-powder systems and liquid-liquid systems. Such compositions in accordance with the present invention are characterized by the use of a polymerizable monomer comprising an aromatic dimethacrylate, preferably an aromatic dimethacrylate based upon bisphenol A, i.e., p,p'-isopropylidene diphenol. Similarly, the novel photopolymerizable dental compositions of the present invention can be characterized by the presence of an adduct of such dimethacrylate with an organic mono- or diisocyanate. The use of such a polymerizable component, in addition to a diluent monomer, a polymerization inhibitor, optional filler, plasticizer, and photopolymerizable sensitizer, in the aforedescribed phases, provides for a photopolymerizable composition capable of producing excellent composite restorative materials, fissure sealants, cements, cavity liners and restoration glazes, etc.

Accordingly, it is a principal object of the present invention to provide novel photopolymerizable dental compositions which provide distinct improvements over those dental compositions conventionally employed.

It is a further object of the present invention to provide such novel photopolymerizable dental compositions wherein the same are capable of polymerization in situ within the oral environment through the application of light energy, specifically light energy in the far ultraviolet wave length band.

It is yet a further object of the present invention to provide such a dental composition in the form of a composite restorative material, fissure sealant, cement, cavity liner, or restoration glaze, etc., wherein such composition is formulated in two parts, paste-paste, paste-liquid, jelly-powder or liquid-liquid.

It is yet a further object of the present invention to provide such two-part photopolymerizable dental compositions wherein one of the parts contains all of the monomeric ingredients while the other contains all of the photosensitizing or catalytic agents, thereby providing maximum possible shelf life and stability, the composition being polymerized merely by the application of light energy of the desired wave length and sufficient energy.

A still further object of the present invention relates to such novel photopolymerizable dental compositions wherein the monomeric phase is characterized by the presence of an aromatic dimethacrylate, preferably an aromatic dimethacrylate based upon bisphenol A.

Still further objects and advantages of the novel photopolymerizable dental compositions of the present invention will become more apparent from the following more detailed description thereof.

As indicated previously, the above advantages and objects of the present invention are achieved through the provision of a photopolymerizable dental composition, i.e., a composite dental restorative material, which can be photopolymerized in situ, i.e., within the oral environment by the application of light energy, specifically light energy in the near ultraviolet wave length band. In this regard, in accordance with the present invention, such photopolymerizable compositions are those which are capable of being cured by exposure to light of a wave length greater than about 3100 A. up to the limits of ultraviolet light, i.e., approximately 4000 A. By providing such a photopolymerizable composition, the polymerization can be easily controlled and the light energy does not adversely affect within a reasonable length of time, for example 15 minutes, either soft or hard human tissues. Accordingly, the photopolymerizable dental compositions of the present invention are extremely useful and safe and provide the aforementioned advantages with regard to providing a degree of freedom and ease of usage for the operator heretofore unknown.

As indicated previously, the photopolymerizable dental compositions of the present invention are prepared in two components, i.e., two phases, paste-paste, paste-liquid, jelly-powder or liquid-liquid. Preferably, in accordance with the present invention, such components or phases are prepared so that one of the same contains all of the monomeric ingredients, i.e., the aromatic dimethacrylate and diluent monomer to be hereinafter described, while the other phase or component contains all of the photosensitizing or catalytic agents. In this way, by separating the photosensitizing and catalytic agents from the polymerizable monomers, it is possible to produce photopolymerizable dental compositions having the maximum possible shelf life. Even after mixing, however, stability can be maintained for at least several days by providing simple precautions so as to avoid penetration by light energy of the specific photopolymerizing wave length in the ultraviolet region, specifically those in the near ultraviolet wave length band.

One of the components of the novel composition of the present invention comprises a polymerizable monomer, i.e., a dimethacrylate monomer having an aromatic nucleus or an adduct of such a dimethacrylate monomer with an organic isocyanate, i.e., an organic mono- or diisocyanate. In accordance with the present invention, such aromatic dimethacrylates generally correspond to the following formula:

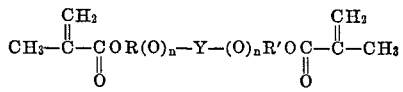

wherein Y represents an aromatic group such as phenylene, diphenylene or a bridged phenylene group of the formula:

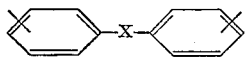

wherein X is elected from lower alkylene, e.g., methylene, ethylene, ethylidene, isopropylene, isopropylidene, butylene, etc.; R and R' represent a hydrocarbon chain having up to 10 carbon atoms, the hydrocarbon chain being optionally substituted with one or more groups such as hydroxyl, carbonyl, etc.; and $n$ is zero or 1, with the proviso that when the adduct component is used, the aromatic dimethacrylate monomer contains at least one hydroxy group capable of reacting with the organic isocyanate.

In accordance with the present invention, those aromatic dimethacrylates which are preferred are those wherein Y is a bridged phenylene group, the most preferred aromatic dimethacrylates being based on bisphenol A, i.e., those in which X represents isopropylidene. Accordingly, a preferred aromatic dimethacrylate can be represented by the following formula:

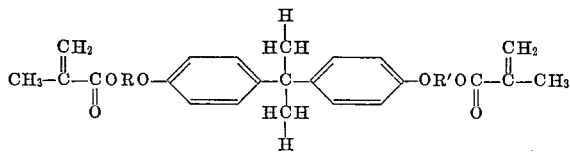

wherein R and R' are as defined above. A particularly preferred aromatic dimethacrylate based upon bisphenol A and falling within the above formula is 2,2'-propane bis[3(4-phenoxy)-1,2-hydroxy propane-1-methacrylate].

As indicated previously, while the photopolymerizable dental compositions of the present invention can contain the aromatic dimethacrylate defined above as such, it is also possible and often preferred in accordance with the present invention, that such dimethacrylate be in the form of an adduct with a suitable organic isocyanate. Thus, the photopolymerizable component of the compositions of the present invention can comprise a suitable adduct of the aforedescribed aromatic dimethacrylate with a suitable organic monoisocyanate organic diisocyanate or organic triisocyanate.

Suitable monoisocyanates which can be employed in accordance with the present invention include alkyl isocyanates wherein the alkyl group ranges from 1 to about 18 carbon atoms, aryl isocyanates, e.g., phenyl and naphthyl isocyanates optionally substituted by one or more alkyl or other non-reactive group, and cycloalkyl isocyanates. Thus, for example, suitable monoisocyanates which can be employed in accordance with the present invention include such as:

alkyl isocyanates:
  methyl isocyanate
  ethyl isocyanate
  n-butyl isocyanate
  isoamyl isocyanate
  n-amyl isocyanate
  hexyl isocyanate
  n-octyl isocyanate
  isooctyl isocyanate
  dodecyl isocyanate
  octadecyl isocyanate, etc.
aryl isocyanates:
  phenyl isocyanate
  tolyl isocyanate
  p-ethylphenyl isocyanate
  benzyl isocyanate
  p-cetyl phenyl isocyanate
  p-dodecylphenyl isocyanate
  4-dodecyl-2-methylphenyl isocyanate
  xylyl isocyanate
  α-naphthyl isocyanate
  p-chlorophenyl isocyanate
  m-chlorophenyl isocyanate, etc.
cycloalkyl isocyanates:
  cyclohexyl isocyanate, etc.

Similarly, suitable diisocyanates or polyisocyanates include the alkylene diisocyanates wherein the alkylene group ranges from 2 to about 18 carbon atoms and arylene and substituted arylene di- and polyisocyanates. Thus, exemplary diisocyanates and polyisocyanates include for example:

alkylene diisocyanates:
  ethylene diisocyanate
  propylene diisocyanate
  tetramethylene diisocyanate
  pentamethylene diisocyanate
  hexamethylene diisocyanate
  octamethylene diisocyanate
  decamethylene diisocyanate
  undecamethylene diisocyanate
  dodecamethylene diisocyanate, etc.
arylene di- and polyisocyanates:
  xylylene-1,4-diisocyanate
  xylylene-1,3-diisocyanate
  m-phenylene diisocyanate
  p-phenylene diisocyanate
  toluene-2,4-diisocyanate
  toluene-2,6-diisocyanate
  mesitylene diisocyanate
  durylene diisocyanate
  benzidene diisocyanate
  1-methyl phenylene-2,4-diisocyanate
  naphthylene-1,4-diisocyanate
  naphthylene-1,5-diisocyanate
  1,2,4-benzene triisocyanate
  3,3'-dimethyl-4,4'-diisocyanato diphenyl methane
  4,4'-diphenyl propane diisocyanate
  dianisidine diisocyanate, etc.

Utilizing as an example of a suitable and in fact preferred aromatic dimethacrylate monomer in accordance with the present invention, 2,2'-propane bis[3(4-phenoxy)-1,2-hydroxy propane-1-methacrylate], the formation of the adduct with a monoisocyanate e.g., phenyl isocyanate, can be represented as follows:

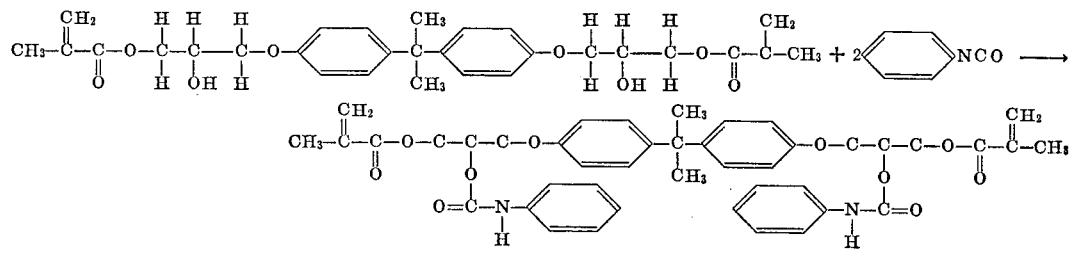

Similarly, an adduct is formed by the reaction of 2,2'-propane bis[3(4-phenoxy)-1,2-hydroxy propane-1-methacrylate] with a diisocyanate, e.g., toluene diisocyanate, can be represented as follows:

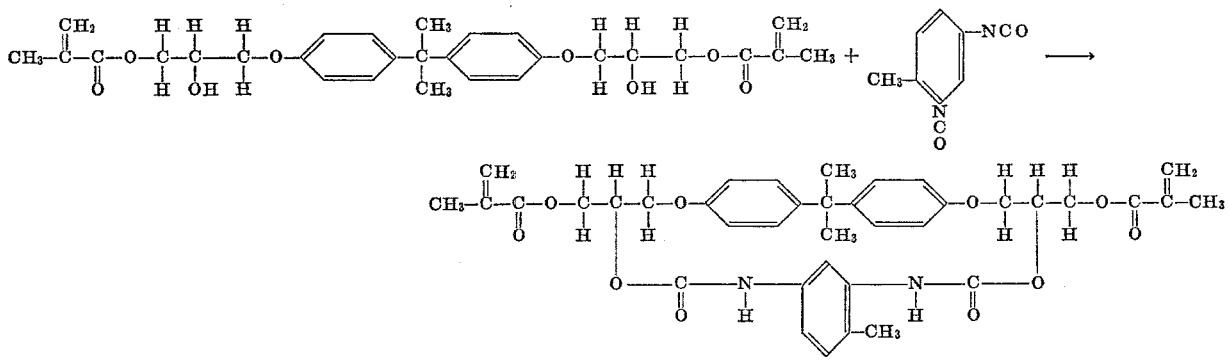

Similarly, while the foregoing exemplary formulae have been illustrated by reference to the use of a single isocyanate or diisocyanate, it should be obvious that mixtures of isocyanates can be advantageously utilized in the preparation of the adducts useful in the photopolymerization dental compositions of the present invention.

A more complete description of such monomers, including the adducts suitably utilized in accordance with the present invention, is set forth in copending application Ser. No. 836,650, now U.S. Pat. 3,629,187. Accordingly, the disclosure of such copending application is herein incorporated by reference.

Again, it is pointed out that the photopolymerizable monomeric material utilized in accordance with the novel dental compositions of the present invention, may comprise any and all of the aromatic dimethacrylates and adducts thereof falling within the foregoing formulae. Thus, for example, exemplary aromatic dimethacrylates which can be utilized in accordance with the present invention can be represented as follows:

| | Y | X | R and R' | n |
|---|---|---|---|---|
| 1 | (phenyl) | | $C_3H_6$ | 0 |
| 2 | Same as above | | $C_3H_6$ | 1 |
| 3 | do | | $C_4H_8$ | 1 |
| 4 | do | | $C_4H_8O$ | 1 |
| 5 | do | | $C_4H_8O$ | 1 |
| 6 | do | | $C_4H_7O$ | 1 |
| 7 | (biphenyl) | | $C_3H_6O$ | 0 |
| 8 | Same as above | | $C_3H_6O$ | 1 |
| 9 | (diphenyl-X) | $CH_2$ | $C_3H_6O$ | 1 |
| 10 | Same as above | $CH_2$ | $C_4H_8$ | 0 |
| 11 | do | $CH_2$ | $C_4H_7O$ | 1 |
| 12 | do | $CH_2$ | $C_6H_{14}O_2$ | 1 |
| 13 | do | $-C(CH_3)-$ | $C_3H_6O$ | 1 |
| 14 | do | $-CH_2-CH_2-$ | $C_3H_6O$ | 1 |
| 15 | do | $-CH_2-CH_2-CH_2-$ | $C_3H_6O$ | 1 |
| 16 | do | cyclohexylene | $C_2H_4$ | 0 |

TABLE—Continued

| | Y | X | R and R' | n |
|---|---|---|---|---|
| 17 | Same as above | Same as above | $C_3H_6$ | 0 |
| 18 | do | do | $C_3H_6$ | 1 |
| 19 | do | do | $C_3H_6O$ | 0 |
| 20 | do | do | $C_3H_6O$ | 1 |
| 21 | do | do | $C_3H_5O$ | 1 |
| 22 | do | do | $C_4H_8O$ | 1 |
| 23 | do | do | $C_4H_8O_2$ | 1 |
| 24 | do | do | $C_4H_7O$ | 1 |
| 25 | do | do | $C_5H_{10}O_2$ | 1 |
| 26 | do | do | $C_6H_{11}O$ | 1 |
| 27 | do | do | $C_6H_{12}O$ | 1 |
| 28 | do | do | $C_8H_{16}O$ | 1 |
| 29 | do | do | $C_8H_{16}O_2$ | 1 |
| 30 | do | do | $C_{10}H_{20}O_3$ | 1 |

Of course, it should be clear from the foregoing that any or all of the aforedescribed exemplary aromatic dimethacrylates can be employed in the form of an adduct of the same with a mono or diisocyanate. Thus, either the monomer itself or the isocyanate adduct, or a mixture of the same can be suitably employed in the novel photopolymerizable dental compositions of the present invention.

A second essential component of the novel photopolymerizable dental compositions of the present invention comprises a diluent monomer or monomers. Such diluent monomers useful in accordance with the present invention may be selected from any of a wide range of well known low viscosity methacrylate monomers generally adapted for use in the oral environment. Accordingly, such diluent monomers which may be suitably employed in accordance with the novel compositions of the present invention include the aliphatic monomethacrylate esters, as well as alkylene dimethacrylates. Accordingly, representative diluent monomers include aliphatic mono- and dimethacrylate monomers such as alkyl methacrylates, e.g., lower alkyl methacrylates, alkylene dimethacrylates, e.g., lower alkylene dimethacrylates, and alkylene and polyalkylene glycol mono- and dimethacrylates. Representative monomers falling within the above groups include such as:

methyl methacrylate
ethyl methacrylate
n-propyl methacrylate
iso-propyl methacrylate
n-butyl methacrylate
iso-butyl methacrylate
sec.-butyl methacrylate
ethylene dimethacrylate
butylene dimethacrylate
ethylene glycol monomethacrylate
triethylene glycol dimethacrylate, etc.

Accordingly, one or more of the foregoing diluent monomers can be advantageously utilized in accordance with the novel photopolymerizable dental compositions of the present invention. It is, of course, obvious that such diluent monomers take part in the photopolymerization reaction and, due to their low viscosity, are present in the compositions of the present invention to provide viscosity control so as to produce the various phase systems set forth previously.

A further component of the novel photopolymerizable dental compositions of the present invention comprises a filler. In this regard, the filler may be any suitable hard vitreous particulate material which has a refractive index not substantially unlike that of the polymer resulting from the photopolymerization reaction. Accordingly, it is preferred in accordance with the present invention that the fillers employed have a refractive index which is no greater than 0.075 different from that of the resulting polymer, most preferably no greater than 0.025 different from the polymer obtained from the photopolymerization reaction. Particularly useful fillers for this purpose are the ground glasses, selected quartziferous minerals and synthetic siliceous material of suitable refractive index and translucency. Thus, for example, the synthetic siliceous materials which can be utilized in accordance with the present invention comprise silicon dioxide and various mixtures of silicon dioxide with other refractory materials such as, for example, titanium dioxide, zirconium dioxide, etc. Accordingly, while titanium dioxide and zirconium dioxide cannot be individually used due to the aforedescribed refractive index requirement, mixtures of such materials with silicon dioxide allow for the preparation of a filler which has the proper refractive index and translucency characteristics. In this regard, it is obvious that the particular filler which is best suited for any particular photopolymerizable dental composition can be easily determined from the standpoint of the refractive index and from the standpoint that the filler should allow the passage of the ultraviolet light effecting the photopolymerization reaction.

Accordingly, fillers with poor translucency characteristics or unsuitable refractive index values, although freely available in harder or denser varieties thereby providing somewhat higher strength and greater percentage loading possibilities, are generally unusable in accordance with the present invention, due to the poor optical properties of pastes made with such materials which necessitates unacceptably lengthy exposures for photopolymerization. In addition, the use of such materials having poor translucency characteristics and unsuitable refractive index values does not allow polymerization to any appreciable depth, due to poor light energy penetration. Accordingly, many of the fillers commonly employed such as zirconium oxide, zirconium silicate, aluminum fluorosilicate, alumina, beryllia, ground topaz, titanium dioxide, tantalum pentoxide, diamond dust and others cannot be employed alone in accordance with the photopolymerizable composition of the present invention.

In accordance with the present invention, the particle size of the filler may vary over wide limits although it is preferred that the average particle size be less than about 10 microns, with as few particles above this dimension as possible. This is done in order to impart optimum grinding and polishing characteristics to the set material since the presence of large particle size materials could produce pits or holes upon polishing and grinding. The lower limit, of course, is not in any way set since particles as small as obtainable can be utilized in accordance with the novel polymerizable dental composition of the present invention. In this regard, it is often preferred to include within the composition a minor amount of a material such as submicron silica which acts as a thickener in the composition. Accordingly, the lower limit with respect to particle size of the filler or thickener utilized is that which can be practically obtained by known grinding or subdividing techniques. The filler is generally present in an amount sufficient to provide the desired filled dental restorative material.

A further component which can be employed in accordance with the novel photopolymerizable dental compositions of the present invention comprises a polymerization inhibitor, i.e., a material included within the composition to prevent premature polymerization of the monomers present. In this regard, when utilized, the polymerization inhibitor is preferably selected from the well known hydroquinone derivatives useful to prevent premature polymerization in resinous dental compositions and similar materials. Thus, for example, an extremely suitable polymerization inhibitor comprises hydroquinone methyl ether. Other suitable polymerization inhibitors which can be advantageously utilized in accordance with the present invention include such as:

hydroquinone
butylated hydroxy toluene
catechol
catechol methyl ether
tert.-butyl catechol
pyrogallol
pyrogallol monomethyl ether
pyrogallol dimethyl ether As will be illustrated hereinafter, by reference to specific compositions, the polymerization inhibitor is generally employed in a very minor amount in the monomer phase of the dental composition. In this regard, by utilizing such a polymerization inhibitor and further by separating the monomers and catalysts into two phases as hereinbefore described, it is possible to produce a photopolymerizable dental composition having the maximum possible shelf life. Accordingly, a stable system can be produced by the use of polymerization inhibitor and through the provision of the two phase or two component system whereby the polymerizable monomers and polymerization catalysts are separated from one another. In addition, as indicated previously, by taking certain precautions to eliminate exposure to ultraviolet light, the dental compositions of the present invention can remain stable and free from premature polymerization even after the phases or components have been mixed and the catalysts and polymerizable monomers are in a single phase.

In order to act as a solvent for the hereinafter discussed catalysts, the dental compositions of the present invention contain a plasticizer or plasticizer blend. In this regard, the plasticizer or plasticizer blend employed in the novel photopolymerizable dental compositions of the present invention may consist of any single or combination of nontoxic acrylic-compatible high and low viscosity plasticizers which are chemically inert with respect to the catalysts and photosensitizers utilized. Two very suitable classes of plasticizers having the above characteristics and providing suitable viscosity control and refractive index characteristics to the composition include the well known esters of phthalic acid and derivatives of abietic acid, the combination of materials from these classes being a particularly suitable plasticizer blend in accordance with the present invention.

Thus, for example, a suitable class of plasticizers includes the aliphatic and aromatic mono- and diphthalic esters. Included within such group of operable plasticizers, preferably utilized in accordance with the present invention, are such materials as butyl phthalate, octyl phthalate, diethyl phthalate, dibutyl phthalate, dioctyl phthalate, ethyl benzyl phthalate, butyl benzyl phthalate, etc. Again, such phthalate plasticizers are a well known group of chemical materials, any of which can be advantageously utilized in accordance with the novel photopolymerizable dental compositions of the present invention.

A second group of suitable plasticizers which can be advantageously utilized in accordance with the present invention comprises the abietic acid derivatives, particularly hydrogenated esters of abietic acid. Thus, for example, suitable plasticizers falling within the above class include the hydrogenated esters such as methyl abietate, butyl abietate, octyl abietate, etc. Here again, such hydrogenated abietic ester plasticizers are well known and any of those generally utilized for the plasticization of polymers and acrylic polymers in particular can be advantageously utilized in the novel photopolymerizable dental compositions of the present invention. The hydrogenated abietic acid esters are preferred, of course, since unsaturation is undesirable in the plasticizer.

In addition to the above groups of plasticizers, it should be clear that there are other conventional plasticizers which can be advantageously utilized in accordance with the present invention. Accordingly, such plasticizers include the well known sebacate plasticizers, adipate plasticizers, hydrocarbon plasticizers, phosphate plasticizers, etc. In addition, as previously indicated, it is often preferred in accordance with the present invention to utilize a plasticizer blend, which comprises a combination of two or more plasticizers from the same class or from different classes. Accordingly, a suitable plasticizer advantageously utilized in accordance with the present invention can contain a phthalate ester and a hydrogenated derivative of abietic acid.

As stated above, the plasticizer or plasticizer blend tends to act as the solvent medium for the catalysts utilized in the compositions of the present invention. The essential catalyst component, of course, is the photosensitizer which is excited upon exposure to ultraviolet light, thereby initiating free radical polymerization. Suitable photosensitizing agents employed in accordance with the novel composition of the present invention can comprise any of those conventionally utilized to produce or initiate photopolymerization reactions. However, it is preferred in accordance with the present invention that the photosensitizing agent be selected from benzoin alkyl ethers and various substituted benzophenone derivatives. Thus, for example, suitable benzoin alkyl ethers include the benzoin lower alkyl ethers such as benzoin methyl ether, benzoin ethyl ether, benzoin butyl ether, etc. Similarly, the benzophenone derivatives which have been found to be particularly suitable in accordance with the present invention include such materials as 4,4'-dimethyl benzophenone, 4-methacryloxy benzophenone and similar well known photosensitizing agents. In this regard, the above photosensitizing agents, as well as various others, can be found in Oster, Gerald and Yang, Nan-Loh, Chemical Reviews, 68, 125 (1968). Accordingly, as the above article pertains to various useful photosensitizing agents for photopolymerization reactions, the same is incorporated herein by reference.

In accordance with the present invention, the use of the photosensitizing agent in the photopolymerizable dental composition allows for the quick onset of polymerization and curing when the composition is subjected to light energy of wave length greater than 3100 A. emitted from the center of a 40-watt high-pressure mercury arc lamp and transmitted through a 6" length of 1/4" diameter UV transmitting quartz rod with an air gap of less than 1/2". Utilizing such ultraviolet light within the aforementioned limits allows the obtaining of a solid mass having a compression strength exceeding 30,000 p.s.i. at a depth of at least one millimeter within a time period of about 2 minutes. This, of course, is well within the time limits which a dentist finds suitable.

As indicated previously, the use of the photosensitizing agents in the photopolymerizable dental compositions allows for the onset of polymerization and the production of a hard solid mass almost immediately upon radiation with ultraviolet light. In this regard, within about 40 seconds, the polymerization of the monomers present is largely complete, due to the free radical polymerization initiated by the use of the photosensitizing agents and ultraviolet light. In order to have substantially complete polymerization of the monomers within the shortest period of time, it is often preferred to include in addition to the photosensitizing agents a conventional free radical polymerization catalyst. By using such a catalyst, the free radical polymerization initiated by the use of the photosensitizing agent and radiation with ultraviolet light can be continued up to substantial completion through the catalytic activity of the free radical polymerization catalyst. In this way, it is possible to provide substantially complete polymerization within the shortest possible time, thereby providing maximum hardness and strength to the dental composition with the minimum inconvenience to the patient and maximum of ease to the operator.

Accordingly, pursuant to a preferred embodiment of the present invention, in addition to the presence of the photosensitizing agent, the photopolymerizable dental composition contains a conventional free radical polymerization catalyst, preferably an organic peroxide. Thus, for example, the novel compositions of the present invention may contain a minor amount of an organic peroxide free radical polymerization catalyst such as, for example, t-butyl peroxide, lauryl peroxide, benzoyl peroxide, etc. Of the above, benzoyl peroxide is a preferred free radical polymerization catalyst utilized in accordance with the present invention. It should be recognized, however, that while the organic peroxide and benzoyl peroxide in particular are preferred, any conventional free radical polymerization catalyst can be advantageously utilized in accordance with the present invention. In this connection, the presence of the free radical polymerization catalyst allows the system to provide a more complete polymerization and curing of the monomers in a shorter period of time than possible with the use of the photosensitizing agent alone. Again, while the use of the photosensitizing agent allows for a very rapid onset of polymerization which is largely complete within a period of about 40 seconds, the additional presence of the free radical polymerization catalyst takes the system to substantially complete polymerization within a limited time period.

Accordingly, through the conjoint presence of the photosensitizing agents and free radical polymerization catalysts, it is possible to produce a hard solid mass having a compressive strength exceeding 30,000 p.s.i. to a depth of at least 1 millimeter within the time period of about two minutes. Again, this allows for minimum inconvenience to the patient and maximum ease for the operator.

As indicated previously, it is an important consideration of the photopolymerizable dental compositions of the present invention that the fillers utilized have a refractive index which is no greater than 0.075, preferably no greater than .025, different from that of the polymer resulting from the photopolymerization reaction. Thus, as previously indicated, useful fillers which have the necessary translucency characteristics and a suitable refractive index can be selected from various known ground glasses, quartziferous minerals, and synthetic siliceous material, preferably mixed refractory oxides. In accordance with a further embodiment of the present invention, each of such various types of fillers which can be advantageously utilized in accordance with the present invention, is silanated in a manner well known in the dental art. In this regard, by preparing the fillers with a substantially monomolecular layer of a suitable silane bonding agent, it is possible to produce a stronger bond between the filler particles and the resinous portion of the dental composition. The silane bonding agents which can be employed so as to provide this greater adhesion between the filler and resin can be any of those well known in the art for producing such adhesion. Thus, for example, reference is made to U.S. Pats. 3,423,828 and 3,423,831, which respectively illustrate the use of silane bonding agents to create greater adhesion between filler and resin material in the production of a composite dental product. Thus, for example, the preferred silane bonding agents which can be utilized in accordance with the present invention comprise those of the generic formulae $RSiX_3$, $R_2SiX_2$ and $R_3SiX$ in which X is selected from the halogen, alkoxy and hydroxyl groups, and other groups reactable with silanol, and wherein R is selected from the vinyl, methacrylate, allyl, methallyl, itaconate, maleate, acrylate, aconitate, fumarate, alkyl, aryl, alkenyl, crotonate, cinnamate and citraconate, sorbate and glycidyl groups. Examples of the compounds which may be utilized include the following: vinyl dimethyl chlorosilane, vinyl dimethyl methoxysilane, divinyl chloromethylsilane, vinyl trichlorosilane, vinyl dichloromethylsilane, 3-(trimethoxysilyl) propyl methacrylate or cinnamate, 3-(glycidoxy propyl) trimethoxysilane, bis(glycidoxypropyl)dimethyl disiloxane, trimethoxy vinyl silane, tri(methoxyethoxy)vinyl silane, triethoxy vinyl silane, vinyl silyl triacetate, gamma(methacryloxypropyl)trimethoxy silane, trimethoxy allyl silane, diallyl diethoxysilane, allyl triethoxy silane, 3-(methoxydimethyl silyl)propyl allyl fumarate, 3-(chlorodimethylsilyl)propyl methacrylate and either the 3-trimethoxysilyl)propyl allyl maleate, fumarate, itaconate or sorbate, vinyltris(beta-methoxyethoxy) silane, beta(3,4-epoxycyclohexyl)ethyl triethoxysilane, diphenyl diethoxy silane, amyl triethoxysilane, acrylatotris(methoxysilane), etc.

It is to be pointed out, however, that any or all of the above or equivalent silane bonding agents can be advantageously utilized in accordance with the present invention as a substantially monomolecular coating upon the filler particles so as to improve adhesion between the filler and resin component of the novel dental compositions of the present invention. In addition, as previously indicated, it is often desirable in accordance with the present invention to include within the composition a minor amount of a submicron thickener, e.g., submicron silica, to aid in controlling the viscosity of the various phases of the composition.

The compositions of the present invention find utility in substantially all dental applications. Such photopolymerizable compositions, however, are particularly adapted as composite restorative materials, fissure sealants, cements, cavity liners and restoration glazes. In this regard, all of such compositions are capable of being photopolymerized in situ within the oral environment in accordance with the use of the novel compositions of the present invention.

A composite restorative material is essentially what its name indicates, i.e., a composite material of plastic and a refractory filler, the composition being capable of simulating and restoring the natural functions of the teeth. In accordance with the present invention, such a composite restorative material can be suitably prepared in accordance with the present invention by providing either two paste phases, a paste and a liquid phase, or a jelly and powder phase. In each of the systems, it is important that the polymerizable monomers be separated in a system different from that containing the photosensitizing agent and optional free radical polymerization catalyst since, as indicated previously, this allows for maximum shelf life and stability of the photopolymerizable composition.

In the paste-paste composition of the present invention, both the paste phase containing the polymerizable monomers, e.g., aromatic dimethacrylate and diluent monomer, and the phase containing the catalyst, i.e., photosensitizing agent and optional free radical polymerization catalyst, contain a suitable amount of filler so as to produce the consistency of a paste. In addition, the catalyst paste contains the necessary plasticizer which, as indicated previously, acts as a solvent for the photosensitizing agent and optional free radical catalyst.

As indicated previously, in accordance with the paste-paste system, as well as all of the systems to be hereinafter described, it is preferred that the polymerizable monomers be present in the phase not containing any of the catalysts, e.g., photosensitizing agent and optional free radical polymerization catalyst. Accordingly, the monomer paste of the paste-paste system consists essentially of the aromatic dimethacrylate monomer or adduct thereof with the organic mono- or diisocyanate, diluent monomer, polymerization inhibitor, and filler. On the other hand, the catalyst paste contains the plasticizer acting as a solvent for the catalyst, the photosensitizing agent, filler, and optional free radical polymerization catalyst.

The monomer paste in accordance with the present invention consists essentially 9–16% by weight of the photopolymerizable aromatic dimethacrylate monomer or mono- or diisocyanate adduct thereof, 9–16% by weight of the diluent monomer, 65–75% by weight of the filler, and 100–500 p.p.m. of the polymerization inhibitor. Preferably the aromatic dimethacrylate monomer or adduct thereof is present in an amount of 12–15% by weight, the diluent monomer present in an amount of 12–15% by weight, the filler present in an amount of 70–74% by weight, and the inhibitor present in a minor amount of 200–300 p.p.m., all based upon the total weight of the monomer paste. By utilizing such amounts of the liquid polymerizable monomers and solid filler, it is possible to produce a paste consistency which is easily worked and subsequently utilized in the photopolymerization reaction to produce a hard solid composite restorative material having excellent strength characteristics.

In the catalyst paste which is mixed with the monomer paste to produce the photopolymerizable composite restorative material, the filler again generally constitutes about 65–75% by weight. The photosensitizing agent is present in an amount of from 2–5% by weight, while the optional free radical polymerization catalyst can be present in an amount up to about 3% by weight. The remainder of the catalyst paste is the plasticizer which provides the proper consistency for the catalyst paste, while acting as a solvent for the photosensitizing agent and optional free radical polymerization catalyst. In accordance with the preferred embodiment of the present invention, such catalyst paste consists essentially of 70–74% by weight filler, 2.5–3% by weight photosensitizing agent, 1.5–2.5% free radical polymerization catalyst, with the remainder comprising the plasticizer.

As indicated previously, it is often preferred in accordance with the present invention that the filler comprise a silanated vitreous filler, which has better adhesion to the polymer produced from the photopolymerization of the monomers present. In addition, a small percentage of the filler utilized in either the monomer paste or catalyst paste can constitute a submicron material such as submicron silica, which in addition to filling the composition acts as a thickener of either or both of the paste phases.

No special precautions are necessary in mixing either the monomer paste or catalyst paste in the production of a paste-paste photopolymerizable composite restorative material. In this regard, it is merely necessary to mix the solid or filler component with the liquid components, i.e., monomers or plasticizer, until a composition of the paste consistency results. In this regard, since the monomers are separated from the polymerization catalyst until the monomer paste and catalyst paste are mixed, the paste-paste photopolymerizable composite restorative material has the maximum possible shelf life and stability. In addition, the composition is still fairly stable even after mixing the monomer and catalyst pastes if some care is taken to avoid exposure of the system to ultraviolet light. Thus, for example, until the composite restorative material is ready for use, the same may be protected from premature polymerization in some elementary fashion such as, for example, storage in opaque glass or metal containers. Accordingly, the stability of the composition allows the same to be mixed somewhat ahead of anticipated usage with no resultant waste; and with the further advantage of allowing bubbles to escape from the mixture.

In preparing the composition for use, the monomer paste and catalyst paste can be mixed in widely varying ratios. Although the paste can be mixed in greatly varying ratios, it is preferred in accordance with the present invention that the ratio of monomer paste to catalyst paste in the preparation of the photopolymerizable composite restorative material be within the range of about 4:1 to about 20:1. In this regard, when the ratio of the monomer paste to catalyst paste is somewhat greater than 20:1, insufficient photosensitizing agent is present in the system, thereby generally providing an unduly long period for the necessary polymerization. Similarly, when the ratio of monomer paste to catalyst paste is somewhat less than 4:1, the composition tends to contain too much plasticizer, thereby reducing the strength characteristics and hardness of the composite restorative material obtained through the photopolymerization reaction. Accordingly, it is preferred in accordance with the present invention that the monomer paste and the catalyst paste be mixed in the ratios set forth above in order to achieve a composite restorative material having maximum strength and hardness characteristics within the minimum period of time. In this regard, when operating within the aforedescribed limits, it is possible to provide a composite restorative material which develops adequate early strength for conventional finishing after polymerization.

As indicated previously, a very advantageous photopolymerizable composite restorative material can be produced in accordance with the present invention from a paste-liquid system. In this regard, the monomers are again prepared in a paste form with fillers and polymerization inhibitor. Accordingly, the monomer paste that can be utilized in the paste-liquid system is essentially the same as set forth above with regard to the monomer paste in the paste-paste composite restorative material.

The liquid phase of the plaste-liquid system is also similar to the catalyst phase of the paste-paste composite restorative material. Here, however, the liquid phase containing the photosensitizing agent, optional free radical polymerization catalyst, and plasticizer contains no fillers or thickening agent. In this regard, in accordance with the present invention, the photosensitizing agent is present in an amount of about 10–40% by weight, the free radical polymerization catalyst in an amount of up to about 10% by weight, with the remainder of the liquid composition consisting of the plasticizer. In accordance with the preferred embodiment of the present invention, such liquid catalyst phase of the paste-liquid system consists essentially of 25–35% by weight of the photosensitizing agent, 3–5% by weight of the free radical polymerization catalyst, and the remainder comprising the plasticizer. Of course, as indicated previously, such plasticizer can preferably comprise a mixture or blend of plasticizers, preferably selected from phthalate and abietate plasticizers.

Here again, as was the case with respect to the preparation of the paste-paste system, no special precautions need be taken in the preparation of the paste and liquid phases of the paste-liquid composite restorative material. With regard to the monomeric paste phase, however, it is preferred that the amount of filler be near the upper limit set forth previously in that the paste should be marginally stiffer than the monomer paste utilized in the paste-paste system. A stiffer paste can be tolerated in that the paste is mixed with a liquid in the production of the photopolymerizable composite restorative material.

With regard to the liquid catalyst phase, no special precautions need be taken since it is only necessary to mix the catalyst components with the liquid plasticizer. In this regard, it is to be recalled that the plasticizer is present in the liquid phase in order to plasticize the composition, control the viscosity and to act as a solvent for the photosensitizing agent and optional free radical polymerization catalyst.

Here again, in preparing the photopolymerizable composite restorative material from the monomer paste and catalyst liquid systems, such paste and liquid phases can be mixed in widely varying ratios. However, it is preferred in accordance with the present invention that the ratio of monomer paste to catalyst liquid to from about 10:1 to about 25:1. Here again, when the monomer paste is present in greater than about 25 parts to 1 part of the catalyst liquid, insufficient catalyst is present so that the polymerization of the monomers takes an unduly long time. Similarly, when the ratio of monomer paste to catalyst liquid is less than about 10:1, the composition tends to possess too much plasticizer, thereby reducing the strength and hardness characteristics of the final product. However, by operating within the foregoing limits, it is possible to produce a composite restorative material having excellent strength and hardness characteristics within the shortest possible period of time.

It is further pointed out that a suitable photopolymerizable composite restorative material can be prepared by mixing a jelly phase with a powder phase. Here again, in order to separate the polymerizable monomers from the catalyst components, the jelly phase contains the aromatic dimethacrylate monomer or adduct thereof, diluent monomer, thickener, and polymerization inhibitor. The powder phase, on the other hand, contains the photosensitizing agent, optional free radical polymerization catalyst, and filler.

With regard to the jelly-powder compositions, useful in accordance with the present invention as composite restorative materials, the jelly phase contains all of the polymerizable monomers. In this regard, the jelly phase of the photopolymerizable dental composition generally contains from about 38% to about 60% by weight of the aromatic dimethacrylate monomer or adduct thereof with an organic mono- or diisocyanate, 35% to about 48% by weight of the diluent monomer, 5–8% by weight of a filler or thickener, preferably a submicron thickener, and from about 100–500 p.p.m. of a polymerization inhibitor. When the adduct is empolyed as the polymerizable component of the jelly phase of such a jelly-powder composition, the amount of adduct will depend somewhat upon the molecular weight of the adduct product. In this regard, where the adduct is of a higher molecular weight, less of the same can be advantageously utilized since less of the higher molecular weight material will produce a jelly of suitable consistency. It is preferred, however, that the aromatic dimethacrylate monomer or adduct thereof be present in the foregoing amount, most preferably in the amount of from about 45–50% by weight based upon the total weight of the jelly phase. Similarly, the diluent monomer employed in the jelly phase in the jelly-powder composition is preferably employed in a weight percent of 45–50% based upon the jelly phase of the composition. The thickener is also preferably employed in the amount of about 6–7% by weight, while the polymerization inhibitor is preferably present in the jelly phase of the composition in an amount of about 200–300 p.p.m.

Again, it is pointed out that maximum stability and shelf life is achieved in accordance with the present invention by including the polymerization catalyst in a phase which is separate and distinct from that phase containing the polymerizable monomers. Accordingly, all of the polymerization catalysts are employed in the powder phase of the jelly-powder composite restorative material.

Accordingly, the powder phase of the jelly-powder photopolymerizable composite restorative material generally contains from about 1.0% to 4.0% by weight of the photosensitizing agent, preferably from about 2.0% to about 3.0% by weight of such agent. The free radical polymerization catalyst optionally employed in the powder phase of the jelly-powder photomerizable dental composition can also be employed in an amount of up to about 0.75% by weight, preferably in an amount of about 0.4% to about 0.6% by weight. The remainder of the catalyst phase, i.e., the powder phase of the jelly-powder composition, comprises the filler.

In preparing the final composite restorative material utilizing the jelly-powder system, the two phases are generally mixed in a ratio of powder to jelly of 2:1 to 3.5:1. Again, such a system is generally mixed through mechanical means so as to provide a homogeneous composite restorative material from the jelly and powder phases. Here again, when such a system is photopolymerized in accordance with the present invention, a hard, strong restorative material is prepared within a short period of time through the action of the photosensitizing agent and the continued action of the optional free radical polymerization catalyst. Thus, as was the case with regard to the paste-paste system and paste-liquid system described above, a product having a compressive strength significantly in excess of 30,000 p.s.i. can be obtained through the photopolymerization of the aromatic dimethacrylate and diluent monomers. Here again, as was the case with regard to the previously described systems, it is often preferred in accordance with the present invention that the filler present in the powder phase be silanated so as to produce greater adhesion between the filler particles and the polymer resulting from the photopolymerization reaction.

With regard to any or all of the above composite restorative materials, it is pointed out that a still further strengthened product can be obtained by replacing a portion of the particulate filler with a conventional fibrous filler so that the fibers comprise up to about 12% by weight of the filler containing phase or phases. In this regard, the use of silanated fibers is even further preferred in that the use of such materials provides greater adhesion between the fibrous filler and the polymer resulting from the photopolymerization reaction. Such fibers which can be advantageously utilized in accordance with the present invention can comprise any of those conventionally utilized to strengthen dental compositions. In this regard, the use of the minor amount of fibers does not in any way detract from the photopolymerization characteristics of the novel composition of the present invention. Accordingly, suitable fibers which can be utilized in accordance with the present invention include such as glass fibers, quartz fibers, and other synthetic vitreous fibers of suitable refractive index and translucency. Again, such fibrous material and silanated fibrous materials in particular can be employed as partial replacement for the vitreous particulate filler employed in any or all of the above-described composite dental restorative materials. Thus, again, the use of the said fibrous materials and silanated fibrous materials in particular allows for the production of a photopolymerizable composite restorative material having enhanced strength characteristics.

In addition to the optional use of fibrous materials as a partial replacement for a portion of the vitreous particulate filler, it is pointed out that radiopaque versions of the foregoing composite restorative materials can be prepared by substituting a radiopaque filler for all or a portion of the non-radiopaque filler described. Thus, for example, conventional radiopaque filler materials such as barium glass or silicate materials of inherently low leach characteristics, evaluated by prolonged contact with acetic acid, i.e., 5% acetic acid, can be utilized to produce radiopaque composite restorative materials in accordance with the present invention. Here again, however, such materials when employed as a substitute for all or a portion of the non-radiopaque fillers described above should be such that the filler components of the composite restorative material have a refractive index which is no more than 0.075, preferably no more than 0.025 different from that of the polymer resulting from the photopolymerization reaction. When such a characteristic is met and the filler has the required translucency, a composition is prepared in which the photopolymerizable characteristics are not substantially impaired. By utilizing the radiopaque filler materials, however, a restorative is produced which can be readily seen by the use of X-rays. This, of course, is a distinct advantage in that it allows for subsequent ease of operation by the dental operator. Accordingly, the use of such radiopaque fillers constitutes a further embodiment of the novel photopolymerizable dental compositions of the present invention.

In addition to the above further features of the present invention, it is pointed out that it is often preferred in accordance with the present invention that the catalysts, i.e., photosensitizer and optional free radical polymerization catalyst, be coated onto the filler particles. This is particularly true when providing a jelly-powder composite restorative material produced through the use of a mechanical mixer. Accordingly, with respect to such an embodiment of the present invention, the photosensitizer and optional free radical polymerization catalyst may be coated onto the filler particles by means of a suitable inert low boiling point solvent. Such a procedure for coating catalyst components onto the particulate filler is well known in the art and constitutes a further embodiment of the novel photopolymerizable dental compositions of the present invention.

As indicated above, in addition to the composite restorative materials previously described, the novel dental compositions of the present invention can take the form of fissure sealants, cements, cavity liners, restoration glazes, etc. In this regard, all such compositions are photopolymerizable and contain as essential components thereof the photopolymerizable aromatic dimethacrylate monomer, diluent monomer, i.e., an aliphatic mono- or dimethacrylate, photosensitizing agent, optional free radical polymerization catalyst, and a plasticizer. In this regard, the further dental compositions of the present invention differ principally from the aforedescribed composite restorative materials in that such compositions generally do not contain a filler or thickener. It is noted, however, that each of the further compositions in accordance with the present invention has the ability of being polymerized in situ within the oral environment by the application of light energy of wave length greater than 3100 A. emitted from the center of a 40-watt high-pressure mercury arc lamp and transmitted through a 6″ length of ¼″ diameter UV transmitting quartz rod with an air gap of less than ½″. Accordingly, the photopolymerizable characteristics of such further compositions in accordance with the present invention provides further ease and freedom of usage for the operator in a manner heretofore unknown with previous dental compositions.

In accordance with the present invention, a fissure sealant or clear dental cement can be prepared by providing two liquid phases, one of which contains all of the monomeric components, the other containing the catalysts. Again, by separating the monomeric components and catalysts in separate phases, a composition having the maximum possible shelf life and stability is provided.

Similarly, the fissure sealant and clear dental cement utilized in accordance with the present invention differ from the previously discussed composite restorative materials in that both phases are liquid, i.e., such dental compositions are prepared without the use of a filler or thickener material. In this regard, due to the fact that both the monomeric phase and catalyst phase of the dental composition are liquid, no special precautions whatsoever need be taken in mixing the individual phases to produce the photopolymerizable dental composition of the present invention. In this regard, the fissure sealants and clear dental cements are employed without the use of a filler or thickener material since such dental products are utilized in very small film thicknesses in the cementing of orthodontic appliances, etc. Accordingly, since substantial thicknesses are not encountered, there is no need for use of a filler material.

The monomeric phase of the fissure sealant or clear dental cement generally contains from about 50% to about 78% by weight of the aromatic dimethacrylate monomer or adduct thereof, with a mono- or diisocyanate, 22–50% by weight of the diluent monomer, and 100–500 p.p.m. of the polymerization inhibitor. Preferably, the photopolymerizable aromatic dimethacrylate monomer or adduct thereof comprises from about 60–75% by weight of the liquid monomeric phase with the diluent monomer comprising from about 25–40% by weight. Again, the preferred amount of the polymerization inhibitor in accordance with the present invention is 200–300 p.p.m.

With regard to the liquid catalyst phase of the fissure sealant or clear dental cement, it is pointed out that the plasticizer comprises the major portion thereof. Thus, again, the plasticizer acts both to plasticize the polymer produced from the photopolymerization reaction and as a solvent for the photosensitizing agent and any free radical polymerization catalyst. Generally, the photosensitizing agent is present in an amount of from about 3–10% by weight of the liquid catalyst phase with the optional free radical polymerization catalyst being present in an amount of up to 10% by weight. Of course, the remainder of the liquid catalyst phase of the fissure sealant or a dental cement comprises the plasticizer. Preferably, the photosensitizing agent is present in an amount of from about 6–8% by weight and the free radical polymerization catalyst is present in an amount of 2–8% by weight.

Again, it is pointed out that in mixing the liquid phases to produce the fissure sealant or dental cement, no special precautions need be taken. Preferably, the two liquid phases, i.e., liquid monomer phase and liquid catalyst phase, are mixed in a ratio of monomer phase to catalyst phase of 15:1 to 40:1, preferably from about 20:1 to about 30:1. Within these limits, it is possible to produce compositions wherein the resulting compressive strength exceeds 20,000 p.s.i. measured 24 hours after exposure to light energy of wave length greater than 3100 A. emitted from the center of a source at an intensity equivalent to a 40-watt high-pressure mercury arc lamp and transmitted through a 6″ length of ¼″ diameter UV transmitting quartz rod with an air gap of less than ½″.

The last group of compositions suitably prepared in accordance with the present invention comprises the cavity liners and restoration glazing materials.

A dental cavity liner generally comprises a polymerizable system capable of producing a continuous film or lining in a cavity in a tooth so as to provide a base upon which a restorative material or filling can be applied. Thus, for example, like the previously discussed fissure sealants and clear dental cements, it is generally true that the dental cavity liners are produced in the absence of any filler or thickener material. A restoration glazing is quite similar to a transparent dental cement or cavity liner in that it is desirable that such material be transparent and provide only a very thin film of polymerizable material. Here again, therefore, like the previously discussed fissure sealant, clear dental cement and cavity liner, the restoration glazing material is prepared essentially without fillers or thickeners. Accordingly, the cavity liners or restoration glazing materials also comprise two liquid phases, the first comprising a monomeric phase with the second containing the catalyst. Such separation of catalyst and monomers in accordance with the present invention again allows for the maximum shelf life and stability of the dental composition.

The cavity liners and restoration glazing materials differ from the previously described fissure sealants and clear dental cements in that the cavity liners and restoration glazes can be formulated with somewhat less of the aromatic dimethacrylate monomer or adduct thereof. Thus, for example, the aromatic dimethacrylate monomer or adduct thereof generally comprises from about 30–70% by weight, while the diluent monomer comprises from 70–30% by weight of the monomeric liquid phase. Again, such liquid phase generally contains a polymerization inhibitor present in an amount of from 100–500 p.p.m. In accordance with a preferred embodiment of the present invention, the liquid phase of the cavity liner or restoration glazing contains from about 45% to about 55% by weight of the aromatic dimethacrylate monomer or adduct thereof and 55–45% by weight of the diluent monomer. Again, as was the case with the aforediscussed dental compositions the polymerization inhibitor in the monomeric phase is preferably present in the amount of from about 200–300 p.p.m.

The catalyst phase of the photopolymerizable cavity liner or restoration glazing material does not substantially differ from the previously described liquid catalyst phase for the fissure sealant or clear dental cement. Accordingly, here again, such catalyst phase is composed principally of the plasticizer with minor amounts of the photosensitizing agent and optional free radical polymerization catalyst. Generally, the photosensitizing agent is present in an amount of from about 3% to about 10% by weight with the free radical polymerization catalyst present in an amount of up to 10% by weight. The remainder of the composition, of course, comprises the plasticizer which acts to plasticize the polymer produced from the photopolymerization reaction and as a solvent for the photosensitizing agent and any free radical polymerization catalyst. In accordance with the preferred embodiment of the present invention, the liquid catalyst phase for the cavity liner or restoration glazing, contains approximately equal amounts of the photosensitizing agent and free radical polymerization catalyst. Accordingly, in accordance with such preferred embodiment, each of such catalyst components is present in an amount of from about 6% to about 8% by weight with the remainder of the liquid catalyst phase comprising the plasticizer.

Again, to produce the cavity liner or restoration glazing in accordance with the present invention, the liquid phases are mixed without the necessity of any special precautions. Generally, the liquid monomer phase and liquid catalyst phase are mixed in a ratio of from about 15:1 to about 40:1, preferably a ratio of liquid monomer phase to liquid catalyst phase of from about 20:1 to about 30:1.

With regard to each of the above compositions, it is pointed out that in addition to the particular components indicated, the dental compositions of the present invention can contain other conventional components generally employed for dental applications. Thus, for example, the dental compositions of the present invention, particularly the dental restorative materials, can contain fluorides, pigments, bacteriostatic agents, and antibiotics in minor amounts. In this regard, the addition of such components in minor amounts in dental compositions is conventional in that such materials provde some antibacterial or anticariogenic action to the dental compositions.

It is further pointed out in accordance with the present invention that when utilizing the novel photopolymerizable dental compositions of the present invention, the same can be utilized in the same manner as the conventional compositions usually utilized to perform the same dental applications. In this regard, it is generally true that no special precautions or manipulations need be taken except to prevent premature exposure to ultraviolet light so as to provide sufficient stability and sufficient freedom from premature polymerization of the photopolymerizable dental compositions. The use of the photopolymerization reaction in accordance with the present invention merely serves as a novel means through which the monomeric materials can be polymerized and set so as to form a hard, solid mass. Thus, the use of the near ultraviolet light to photopolymerize the aromatic dimethacrylate monomer or adduct thereof and diluent monomer in accordance with the present invention serves the same function as the polymerization catalysts generally utilized in conventional dental compositions. The use of ultraviolet light for purposes of photopolymerization, however, has the advantage of allowing great freedom to the operator since the operator can merely place or apply the dental compositions of the present invention and then effect their cure whenever desired.

Again, it is pointed out that in accordance with the present invention, the ultraviolet light effecting the photopolymerization should be light within the wave length region of about 3100 A. to about 4000 A., i.e., at or near the upper wave length limit of ultraviolet light. On exposure to light energy of wave length greater than 3100 A. emitted from the center of a 40-watt high-pressure mercury arc lamp and transmitted through a 6" length of ¼" diameter UV transmitting quartz rod with an air gap of less than ½", with the present invention it is possible to provide a hard, solid mass exceeding 30,000 p.s.i. compressive strength to a depth of at least one millimeter within a time period of about two minutes.

As previously set forth, the use of the photopolymerization reaction in accordance with the present invention, utilizing the photosensitizing agent, allows for a very rapid polymerization, i.e., to about 80% completion within a time period of about 40 seconds. To increase the polymeriaztion even further, it is preferred in accordance with the present invention to include a free radical polymerization catalyst, e.g., an organic peroxide catalyst which results in essentially complete polymerization within a period of about seven hours. Again, a sufficiently hard and strong product is produced within a period of about two minutes so that the use of the photopolymerization reaction in accordance with the present invention provides maximum efficiency and convenience to the patient.

It is pointed out with regard to the present invention that since work time and set time are so completely controllable with the photopolymerizable dental compositions of the present invention, exactly fixed ratios of the two phases are not strictly necessary. Thus, as indicated previously, satisfactory results can be obtained by varying the monomer phase and catalyst phase over wide ratios. This, of course, allows for easy packaging and dispensing of the novel photopolymerizable dental compositions of the present invention.

It is pointed out again that in accordance with the present invention, it is a consideration that all separate phases of the restorative material must have a virtually identical refractive index. This is because for effective photopolymerization the light energy must be able to substantially penetrate the whole restoration, unless, of course, the same is built up by a layered technique. For the above reason, it is a characteristic of the present invention that the fillers utilized have a refractive index which is no more than about 0.075, preferably no more than about 0.025 different than the refractive index of the polymer produced by the photopolymerization reaction. Utilizing such matching refractive indices renders the composition essentially translucent and highly mimetic. Accordingly, any pigmentation which may be required in the preparation of a composite restorative material should be selected from ultrafine particulate pigments added in a minimal percentage by weight. When such ultrafine particulate pigments are employed in a minor amount, the gross interference to the penetration of light energy at the preferred wave length is minimal.

Finally, it is again pointed out that the preferred aromatic dimetharylates in accordance with the present invention are those which are based upon a backbone of bisphenol A, and, of course, adducts thereof with mono- and diisocyanates. A particularly preferred monomer useful in accordance with the present invention comprises 2,2' - propane bis[3(4-phenoxy)-1,2-hydroxy propane-1-methacrylate]. In this regard, such a monomer is particularly suited in that, in accordance with the photopolymerization reaction, a very hard and strong material can be prepared with a minimum of inconvenience to the patient and maximum ease to the operator.

A still further preferred material of the present invention comprises the adduct of such a monomer with a diisocyanate such as hexamethylene diisocyanate.

The novel dental compositions of the present invention will now be illustrated by reference to the following specific examples wherein, unless otherwise indicated, percentages are by weight.

EXAMPLE I

Preparation of paste-paste composite restorative material.

A composite dental restorative material was produced by preparing a powder phase containing grated, cleaned and silanated vitreous lithium aluminum silicate of an average particle size of less than 10 microns, and mixing with a submicron fumed silica as a thickening agent, the mixture of filler and thickening agent being mixed with a monomeric blend of an adduct of hexamethylene diisocyanate and 2,2'-propane bis[3(4-phenoxy)-1,2-hydroxy propane-1-methacrylate] and ethylene dimethacrylate to produce a solid phase having the consistency of a paste. A small amount of a polymerization inhibitor, hydroquinone methyl ether, was added to the solid phase containing the filler, thickening agent and monomeric blend.

The above paste was then mixed with about one-tenth of its weight of a catalyst paste consisting of grated, cleaned and silanated vitreous aluminum silicate filler having an average particle size of less than 10 microns, submicron fumed silica as a thickening agent, butyl benzyl phthalate and hydrogenated methyl abietate plasticizer blend, benzoin methyl ether photosensitizing agent, and benzoyl peroxide as a free radical polymerization inhibitor. The catalyst paste was prepared merely by mixing the filler and thickening agent with the plasticizer solution of the catalyst components, the plasticizer acting as a solvent for the photosensitizing agent and free radical polymerization catalyst.

The dental composite restorative material had the following composition:

Universal paste

| | | |
|---|---|---|
| Ethylene dimethylacrylate | percent | 13 |
| Hexamethylene diisocyanate adduct of 2,2'-propane bis[3(4 - phenoxy)-1,2-hydroxy propane-1-methacrylate] | percent | 13 |
| —10μ silanated lithium aluminum silicate | do | 72 |
| Submicron silica | do | 2 |
| Hydroquinone methyl ether | p.p.m. | 250 |

Catalyst paste

| | | |
|---|---|---|
| Butyl benzyl phthalate | percent | 10.5 |
| Methyl abietate (hydrogenated) | do | 10.5 |
| Benzoin methyl ether | do | 2.5 |
| Benzoyl peroxide | do | 2.5 |
| —10μ silanated lithium aluminum silicate | do | 72.0 |
| Submicron silica | do | 2.0 |

In preparing the final composition prior to photopolymerization, the universal or monomer paste and catalyst paste were mixed in an approximate ratio of 10.1. Such mixture was done by eye-estimation since the ratio of universal paste to catalyst paste can vary over wide limits.

On exposure to light energy of wave length greater than 3100 A. emitted from the center of a 40-watt high-pressure mercury arc lamp and transmitted through a 6" length of ¼" diameter UV transmitting quartz rod with an air gap of less than ½", the above composition provides a mass having a compressive strength significantly in excess of 30,000 p.s.i. to a depth of at least one millimeter within a period of 2 minutes.

EXAMPLE II

A similar photopolymerizable composition as set forth in Example I is produced except that a portion of the silanated vitreous aluminum silicate filler was replaced with 10% by weight of silanated alumina fibers. The replacement of a portion of the particulate filler with the silanated fibers provides for a final composition which has even greater strength characteristics than the photopolymerizable composition of Example I.

EXAMPLE III

The procedure of Example I was again repeated except that the components of the universal paste and catalyst paste employed in the production of the composite restorative material in accordance with the present invention were as follows:

Universal paste

| | |
|---|---|
| 2,2'-propane bis[3(4-phenoxy)-1,2-hydroxy propane-1-methacrylate] _____percent__ | 19.0 |
| Tetramethylene dimethacrylate _____do____ | 6.0 |
| —10μ silanated lithium aluminum silicate ___do____ | 36.5 |
| —10μ silanated alumino silicate glass _____do____ | 36.5 |
| Submicron silica _____do____ | 2.0 |
| Hydroquinone methyl ether _____p.p.m.__ | 250 |

Catalyst paste

| | |
|---|---|
| Diethyl phthalate _____percent__ | 10.5 |
| Ethyl abietate (hydrogenated) _____do____ | 10.5 |
| Benzoin methyl ether _____do____ | 2.5 |
| Benzoyl peroxide _____do____ | 2.5 |
| —10μ silanated lithium aluminum silicate ___do____ | 36.0 |
| —10μ silanated alumino silicate glass _____do____ | 36.0 |
| Submicron silica _____do____ | 2.0 |

In preparing the final composite restorative material, the two pastes, i.e., universal paste and catalyst paste, were again mixed in an approximate 10:1 ratio. On exposure to light energy of wave length greater than 3100 A. emitted from the center of a 40-watt high-pressure mercury arc lamp and transmitted through a 6" length of ¼" diameter UV transmitting quartz rod with an air gap of less than ½", with the present invention it is possible to provide a hard, solid mass exceeding 30,000 p.s.i. compressive strength to a depth of at least one millimeter within a time period of about two minutes.

EXAMPLE IV

The procedure of Example I was again followed except that the universal paste of Example I was mixed with a liquid catalyst paste containing no filler or thickener. Thus, the liquid catalyst was prepared merely by dissolving the benzoyl peroxide free radical polymerization catalyst and a benzoin methyl ether photosensitizing agent in the plasticizer, i.e., butyl benzyl phthalate.

While the composition of the universal paste was as set forth in Example I, the liquid catalyst had the following composition:

Catalyst liquid

| | Percent |
|---|---|
| Butyl benzyl phthalate _____ | 84 |
| Benzoin methyl ether _____ | 8 |
| Benzoyl peroxide _____ | 8 |

In preparing the composite restorative material from the universal or monomer paste and catalyst liquid, the paste and liquid are mixed in a ratio of approximately 30:1. Here again, such a composite restorative material provides a strong, hard product having a compressive strength of at least 30,000 p.s.i. to a depth of one millimeter within a period of two minutes when irradiated with ultraviolet light in the near ultraviolet region.

EXAMPLE V

A further composite restorative material of the paste-liquid type was prepared utilizing the universal paste of Example III with a catalyst liquid composed as follows:

Catalyst liquid

| | Percent |
|---|---|
| Diethyl phthalate _____ | 84 |
| Benzoin methyl ether _____ | 8 |
| Benzoyl peroxide _____ | 8 |

Here again, as was the case with respect to Example IV, the universal or monomer paste and catalyst liquid were mixed in an approximate ratio of 30:1 to produce a composite restorative material which, when subjected to photopolymerization, provides for a strong and hard product.

EXAMPLE VI

The procedure of Example I was repeated, except that the catalyst paste was as follows:

Catalyst paste

| | Percent |
|---|---|
| Butyl benzyl phthalate _____ | 11.0 |
| Methyl abietate (hydrogenated) _____ | 11.0 |
| Benzoin methyl ether _____ | 3.0 |
| —10μ lithium aluminum silicate _____ | 75.0 |

It can be seen that the above catalyst paste differs from that set forth in Example I in that there is no free radical polymerization catalyst and that the thickener, i.e., submicron silica, has been eliminated. Even absent the presence of the free radical polymerization catalyst, however, when the catalyst paste is mixed with the universal or monomer paste of Example I in an approximate ratio of 10:1 of universal paste to catalyst paste, a composite restorative material is produced which, when subjected to photopolymerization, yields a hard and strong product having a compressive strengt hin excess of 30,000 p.s.i. to a depth of at least one millimeter.

EXAMPLE VII

The procedure of Example IV was repeated except that the catalyst liquid in the production of the paste-liquid composite restorative material was composed of the following:

Catalyst liquid

| | Percent |
|---|---|
| Butyl benzyl phthalate _____ | 92 |
| Benzoin methyl ether _____ | 8 |

Here again, it will be noted by comparing Example VII with Example IV that the catalyst liquid phase of Example VII differs by excluding the free radical polymerization catalyst, benzoyl peroxide. However, when the catalyst liquid is mixed with universal paste as in Example IV in an approximate ratio of paste to liquid of 30:1 and the composite restorative material subsequently photopolymerized, a strong and hard dental product is produced.

EXAMPLE VIII

A jelly-powder composite restorative material was produced in accordance with the present invention by preparing jelly and powder phases as follows:

Jelly

| | |
|---|---|
| 2,2'-propane bis[3(4-phenoxy)-1,2-hydroxy propane-1-methacrylate] _____percent__ | 47 |
| Ethylene dimethacrylate _____do____ | 47 |
| Submicron silica _____do____ | 6 |
| Hydroquinone methyl ether _____p.p.m__ | 250 |

Powder

| | |
|---|---|
| Benzoin methyl ether _____percent__ | 20. |
| Benzoyl peroxide _____do____ | 0.5 |
| —10μ silanated lithium aluminum silicate __do____ | 97.5 |

In the production of the composite restorative material, the above jelly and powder phases are mechanically mixed in an approximate ratio of powder phase to jelly phase of 2.5:1. Here again, when such a composite material is photopolymerized with light energy in the near ultraviolet region, a hard and strong product is produced within a period of two minutes.

EXAMPLE IX

A further composite restorative material of the jelly-powder type was prepared as in Example VIII utilizing jelly and powder compositons as follows:

Jelly

| | |
|---|---|
| Hexamethylene diisocyanate adduct of 2,2'-propane bis[3(4 - phenoxy) - 1,2 - hydroxy propane-1 - methacrylate] _____percent__ | 47 |
| Tetramethylene dimethacrylate _____do____ | 47 |
| Submicron silica _____do____ | 6 |
| Hydroquinone methyl ether _____p.p.m__ | 250 |

Powder

| | |
|---|---|
| —10μ silanated alumino silicate glass ___percent__ | 48.5 |
| —10μ silanated lithium aluminum silicate __do____ | 48.0 |
| Benzoin methyl ether _____do____ | 2.0 |
| Benzoyl peroxide _____do____ | 0.5 |

Here again, the final composite restorative material was prepared by mechanically mixing the powder and jelly phases in a ratio of powder to jelly of 2.5:1. When such a composite restorative material is photopolymerized in accordance with the percent invention, a hard and strong product is produced.

EXAMPLE X

The procedure of Example I was repeated except that 50% of the silanated lithium aluminum silicate filler was replaced with a —10μ silanated barium aluminum silicate. Replacement of a portion of the filler with the barium aluminum silicate provided for a composite restorative material having equal strength characteristics but having the property of being radiopaque.

EXAMPLE XI

Example I is again repeated except that the aromatic dimethacrylate adduct was replaced with: (a) an adduct of phenyl isocyanate and 2,2'-propane bis[3(4-phenoxy)-1,2 - hydroxy propane - 1 - methacrylate]; and (b) an adduct of toluene-2,6-diisocyanate and 2,2'-propane bis-[3(4-phenoxy)-1,2-hydroxy propane - 1 - methacrylate]. Utilizing such mono- and diisocyanate adducts of the aromatic dimethacrylate monomer, composite restorative materials of equal strength characteristics are obtained.

EXAMPLE XII

Example III is again repeated except that the aromatic dimethacrylate monomer is replaced with a substantially equivalent amount of the following monomers from the table on pages 17 to 19 of the specification: (a) monomer 1, (b) monomer 4, (c) monomer 7, (d) monomer 9, (e) monomer 15, (f) monomer 19, (g) monomer 23, (h) monomer 29.

Here again, when using all of the above aromatic dimethacrylate monomers, composite restorative materials of approximately equal strength characteristics are obtained when the composite material is photopolymerized.

EXAMPLE XIII

A composition suitable as the fissure sealant or clear dental cement was produced in accordance with the present invention by preparing two liquid phases, a monomeric liquid phase and a catalyst phase. The two liquid phases were merely prepared by hand mixing the various components thereof without taking any special precautions.

The monomeric liquid and catalyst liquid phases had the following composition:

Monomeric liquid

| | |
|---|---|
| 2,2' - propane bis[3(4 - phenoxy) - 1,2 - hydroxy propane - 1 - methacrylate] _____percent__ | 75 |
| Glycidyl methacrylate _____do____ | 25 |
| Hydroquinone methyl ether _____p.p.m__ | 250 |

Catalyst liquid

| | |
|---|---|
| Butyl benzyl phthalate _____percent__ | 84 |
| Benozin methyl ether _____do____ | 8 |
| Benzoyl peroxide _____do____ | 8 |

In preparing the composition suitable as a fissure sealant or clear dental cement, the two liquid phases, i.e., monomeric liquid phase and catalyst liquid phase, were mixed in an approximate ratio of 30:1. Such a composition, when photopolymerized in accordance with the present invention, produced a product having a compressive strength exceeding 20,000 p.s.i., measured 24 hours after usage. On exposure to light energy of wave length greater than 3100 A. emitted from the center of a 40-watt high-pressure mercury arc lamp and transmitted through a 6" length of ¼" diameter UV transmitting quartz rod with an air gap of less than ½", such compressive strength and short exposure time can be compared with exposure times of approximately 35 seconds required for the average restoration polymerized under the same conditions.

EXAMPLE XIV

A further material suitable as a fissure sealant or clear dental cement was produced in accordance with the present invention from a monomeric liquid and catalyst liquid phase as follows:

Monomeric liquid

| | |
|---|---|
| 2,2'-propane bis[3(4-phenoxy)-1,2-hydroxy propane-1-methacrylate] _____percent__ | 75 |
| Methyl methacrylate _____do__ | 25 |
| Hydroquinone methyl ether _____p.p.m__ | 250 |

Catalyst liquid

| | |
|---|---|
| Diethyl phthalate _____percent__ | 84 |
| Benzoin methyl ether _____do__ | 8 |
| Benzoyl peroxide _____do__ | 8 |

Here again, when the monomeric liquid and catalyst liquid phases are mixed as in Example XIII in a ratio of approximately 30:1 of monomeric liquid to catalyst liquid, a product is produced having the strength characteristics, when polymerized, as set forth in Example XIII.

EXAMPLE XV

A still further fissure sealant or clear dental cement was prepared utilizing the same catalyst liquid phase in Example XIII, but with a monomeric liquid phase as follows:

Monomeric liquid

| | |
|---|---|
| 2,2'-propane bis[3(4-phenoxy)-1,2-hydroxy propane-1-methacrylate] _____percent__ | 75.0 |
| Glycidyl methacrylate _____do__ | 12.5 |
| Methyl methacrylate _____do__ | 12.5 |
| Hydroquinone methyl ether _____p.p.m__ | 250 |

Here again, when the monomeric liquid phase and catalyst liquid phase are mixed in a ratio of approximately 30:1, a dental product is produced which, when photopolymerized in accordance with the present invention, provides a very effective fissure sealant or clear dental cement.

EXAMPLE XVI

A material suitable as a cavity liner or restoration glazing material was prepared in accordance with the present invention by again mixing the monomeric liquid phase with a catalyst liquid phase. Again, the monomeric liquid phase contained the aromatic dimethacrylate monomer, diluent monomer, and polymerization inhibitor, while the catalyst phase contained the photosensitizing agent, free radical polymerization catalyst and plasticizer.

The liquid phases were as follows:

Monomeric liquid

| | |
|---|---|
| 2,2'-propane bis[3(4-phenoxy)-1,2-hydroxy propane-1-methacrylate] _____percent__ | 50 |
| Ethylene glycol monomethacrylate _____do__ | 50 |
| Hydroquinone methyl ether _____p.p.m__ | 250 |

Catalyst liquid

Butyl benzyl phthalate _____ percent__ 84
Benzoin methyl ether _____ do__ 8
Benzoyl peroxide (approximate) _____ do__ 8

When the monomeric liquid phase and catalyst phase above are mixed in an approximate 30:1 ratio, a photopolymerizable composition is produced which is exceptionally suited as a cavity liner or restoration glazing. Here again, a strong, hard product is produced when such a composition is photopolymerized in accordance with the present invention.

EXAMPLE XVII

A further cavity liner or restoration glazing material was prepared from monomeric liquid and catalyst liquid phases as follows:

Monomeric liquid 2,2'-propane bis[3(4-phenoxy)-1,2-hydroxy propane-1-methacrylate] _____ percent__ 50
Methyl methacrylate _____ do__ 50
Hydroquinone methyl ether _____ p.p.m__ 250

Catalyst liquid

Diethyl phthalate _____ percent__ 84
Benzoin methyl ether _____ do__ 8
Benzoyl peroxide _____ do__ 8

Again, when the monomeric liquid and catalyst liquid phases are mixed in an approximate 30:1 ratio, a photopolymerizable product is produced which is exceptionally suitable as a cavity liner or restoration glazing.

EXAMPLE XVIII

The further dental product suitable as a cavity liner or restoration glazing was prepared by utilizing the same catalyst liquid as in Example XVI and a monomeric liquid phase as follows:

Monomeric liquid 2,2'-propane bis[3(4-phenoxy)-1,2-hydroxy propane-1-methacrylate] _____ percent__ 50
Ethylene glycol monomethacrylate _____ do__ 25
Methyl methacrylate _____ do__ 25
Hydroquinone methyl ether _____ p.p.m__ 250

Here again, when the monomeric liquid phase and catalyst liquid phase are mixed in an approximate 30:1 ratio, a photopolymerizable composition is produced which is exceptionally suitable as a dental cavity liner or restoration glazing.

The above examples clearly illustrate the applicability of the present invention for the production of composite restorative materials, dental cements, fissure sealants, cavity liners, and restoration glazing materials. In this regard, each of the above compositions is predicated upon the presence of two phases, one of which contains all of the monomeric components, e.g., aromatic dimethacrylate monomer and diluent monomer, while the other contains all of the catalyst components, e.g., photosensitizing agent and optional free radical polymerization catalyst. On exposure to light energy of wave length greater than 3100 A. emitted from the center of a 40-watt high-pressure mercury arc lamp and transmitted through a 6" length of ¼" diameter UV transmitting quartz rod with an air gap of less than ½", in accordance with the present invention, it is possible to produce hard, solid masses exceeding 30,000 p.s.i. compressive strength to a depth of at least one millimeter within a time period of two minutes.

What is claimed is:

1. A photopolymerizable filled composite dental restorative capable of polymerizing when exposed to light consisting essentially of:

(a) a photopolymerizable aromatic dimethacrylate monomer of the formula:

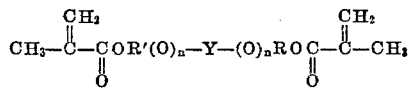

wherein Y is an aromatic group selected from phenylene, diphenylene and bridged phenylene of the formula:

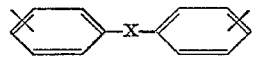

wherein X represents lower alkylene; R and R' are hydrocarbon chains of up to 10 carbon atoms, said hydrocarbon chains being optionally substituted with 1 or more groups selected from hydroxy and carbonyl; and $n$ is 1, or adduct thereof with an organic mono-, di- or triisocyanate, with the proviso that when (a) is said adduct, said aromatic dimethacrylate monomer contains at least 1 hydroxy group capable of reacting with said organic mono-, di- or triisocyanate;

(b) a diluent monomer comprising a polymerizable aliphatic methacrylate or dimethacrylate;

(c) a vitreous particulate filler of an average particle size of less than about 10 microns, said filler having a refractive index differing from the polymer resulting from the photopolymerization by not more than 0.075 and present in an amount sufficient to provide said filled restorative;

(d) a photosensitizing agent capable of initiating free radical polymerization of said photopolymerizable monomer or adduct and diluent monomer upon exposure to light energy of wave length greater than 3100 A. emitted from a source at an intensity equivalent to that from the center of a 40-watt high-pressure mercury arc lamp and transmitted through a 6" length of ¼" diameter UV transmitting quartz rod with an air gap of less than ½";

(e) a polymerization inhibitor capable of inhibiting premature polymerization prior to exposure with said light energy; and (f) a plasticizer for the polymer resulting from the photopolymerization, said plasticizer acting as a solvent for said photosensitizing agent;

said composition being photopolymerizable to a hard, solid mass having a compressive strength greater than 30,000 p.s.i. to a depth of at least 1 mm. within a period of about 2 minutes when exposed to light energy of the above wave length and intensity.

2. The composition of claim 1 wherein said aromatic dimethacrylate monomer comprises a compound of the formula:

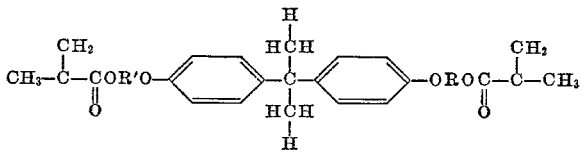

wherein R and R' are hydrocarbon chains of up to 10 carbon atoms, said hydrocarbon chains being optionally substituted with 1 or more groups selected from hydroxy and carbonyl.

3. The composition of claim 1 wherein said plasticizer is selected from phthalate esters, hydrogenated esters of abietic acid, and mixtures thereof.

4. The composition of claim 2 wherein said aromatic dimethacrylate monomer comprises 2,2'-propane bis[3(4-phenoxy)-1,2-hydroxy propane-1-methacrylate].

5. The composition of claim 2 wherein said aromatic dimethacrylate monomer comprises an adduct of 2,2'-propane bis[3(4-phenoxy)-1,2-hydroxy propane-1-methacrylate] and hexamethylene diisocyanate.

6. The composition of claim 1 wherein said photosensitizing agent (d) comprises a benzoin lower alkyl ether.

7. A photopolymerizable dental composite restorative material capable of polymerizing when exposed to light prepared by mixing a monomer paste phase comprising:

(a) 9–16% by weight of a photopolymerizable aromatic dimethacrylate monomer of the formula:

$$CH_3-\underset{\underset{O}{\|}}{C}-COR'(O)_n-Y-(O)_nROC-\underset{\underset{O}{\|}}{C}-CH_3$$
$$\phantom{xxxxxxxxxx}|\phantom{xxxxxxxxxxxxxxxxxxxxx}|$$
$$\phantom{xxxxxxxxxx}CH_2\phantom{xxxxxxxxxxxxxxxxxxx}CH_2$$

wherein Y is an aromatic group selected from phenylene, diphenylene and bridged phenylene of the formula:

$$\text{\phenyl}-X-\text{\phenyl}$$

wherein X represents lower alkylene; R and R' are hydrocarbon chains of up to 10 carbon atoms, said hydrocarbon chains being optionally substituted with 1 or more groups selected from hydroxy and carbonyl; and $n$ is 1, or adduct thereof with an organic mono- di- or triisocyanate, with the proviso that when (a) is said adduct, said aromatic dimethacrylate monomer contains at least 1 hydroxy group capable of reacting with said organic mono-, di- or triisocyanate;

(b) 9–16% by weight of a diluent monomer comprising a polymerizable aliphatic methacrylate or dimethacrylate;

(c) 65–75% by weight of a vitreous particulate filler of an average particle size of less than about 10 microns, said filler having a refractive index differing from the polymer resulting from the photopolymerization by not more than 0.075; and (d) 100–500 p.p.m. of a polymerization inhibitor capable of inhibiting premature polymerization prior to exposure with ultraviolet light;

with a catalyst paste phase comprising:

(e) 2–5% by weight of a photosensitizing agent capable of initiating free radical polymerization of said photopolymerizable monomer or adduct and diluent monomer upon exposure to light energy of wave length greater than 3100 A. emitted from a source at an intensity equivalent to that from the center of a 40-watt high-pressure mercury arc lamp and transmitted through a 6" length of ¼" diameter UV transmitting quartz rod with an air gap of less than ½";

(f) 0–3% by weight of a free radical polymerization catalyst;

(g) 65–75% by weight of a vitreous particulate filler of an average particle size of less than about 10 microns, said filler having a refractive index differing from the polymer resulting from the photopolymerization by not more than 0.075; and (h) a plasticizer for the polymer resulting from the photopolymerization, said plasticizer acting as a solvent for said photosensitizing agent and comprising the remainder of said catalyst paste phase;

said composite restorative material being photopolymerizable to a hard, solid mass having a compressive strength greater than 30,000 p.s.i. to a depth of at least 1 mm. within a period of about 2 minutes when exposed to light energy of the above wave length and intensity, said monomer paste phase and catalyst paste phase being mixed in a ratio of from about 4:1 to about 20:1.

8. The composite restorative material of claim 7 wherein said aromatic dimethacrylate monomer comprises a compound of the formula:

$$CH_3-\underset{\underset{O}{\|}}{C}-COR'O-\text{\phenyl}-\underset{\underset{HCH}{|}}{\overset{\overset{HCH}{|}}{C}}-\text{\phenyl}-OROC-\underset{\underset{O}{\|}}{C}-CH_3$$
$$|\phantom{xxxxxxxxxxxxxxxxxxxxxxxxxxxxxxxxxx}|$$
$$CH_2\phantom{xxxxxxxxxxxxxxxxxxxxxxxxxxxxxxxx}CH_2$$

wherein R and R' are hydrocarbon chains of up to 10 carbon atoms, said hydrocarbon chains being optionally substituted with 1 or more groups selected from hydroxy and carbonyl.

9. The composite restorative material of claim 8 wherein said aromatic dimethacrylate monomer comprises 2,2'-propane bis[3(4-phenoxy)-1,2-hydroxy propane-1-methacrylate].

10. The composite restorative material of claim 8 wherein said aromatic dimethacrylate monomer comprises an adduct of hexamethylene diisocyanate and 2,2'-propane bis[3(4-phenoxy)-1,2-hydroxy propane-1-methacrylate].

11. The composite restorative material of claim 7 wherein said vitreous particulate filler of said monomer paste phase and catalyst paste phase is silanated.

12. A photopolymerizable dental composite restorative material capable of polymerizing when exposed to light prepared by mixing a monomer paste phase comprising:

(a) 9–16% by weight of a photopolymerizable aromatic dimethacrylate monomer of the formula:

$$CH_3-\underset{\underset{O}{\|}}{C}-COR'(O)_n-Y-(O)_nROC-\underset{\underset{O}{\|}}{C}-CH_3$$
$$\phantom{xxxxxxxxxx}|\phantom{xxxxxxxxxxxxxxxxxxxxx}|$$
$$\phantom{xxxxxxxxxx}CH_2\phantom{xxxxxxxxxxxxxxxxxxx}CH_2$$

wherein Y is an aromatic group selected from phenylene, diphenylene and bridged phenylene of the formula:

$$\text{\phenyl}-X-\text{\phenyl}$$

wherein X represents lower alkylene; R and R' are hydrocarbon chains of up to 10 carbon atoms, said hydrocarbon chains being optionally substituted with 1 or more groups selected from hydroxy and carbonyl; and $n$ is 1, or adduct thereof with an organic mono-, di- or triisocyanate, with the proviso that when (a) is said adduct, said aromatic dimethacrylate monomer contains at least 1 hydroxy group capable of reacting with said organic mono- di- or triisocyanate;

(b) 9–16% by weight of a diluent monomer comprising a polymerizable aliphatic methacrylate or dimethacrylate;

(c) 65–75% by weight of a vitreous particulate filler of an average particle size of less than about 10 microns, said filler having a refractive index differing from the polymer resulting from the photopolymerization by not more than 0.075; and (d) 100–500 p.p.m. of a polymerization inhibitor capable of inhibiting premature polymerization prior to exposure with ultraviolet light;

with a liquid catalyst phase comprising:

(e) 2–5% by weight of a photosensitizing agent capable of initiating free radical polymerization of said photopolymerizable monomer or adduct and diluent monomer upon exposure to light energy of wave length greater than 3100 A. emitted from a source at an intensity equivalent to that from the center of a 40-watt high-pressure mercury arc lamp and transmitted through a 6" length of ¼" diameter UV transmitting quartz rod with an air gap or less than ½";

(f) 0–3% by weight of a free radical polymerization catalyst; and (g) a plasticizer for the polymer resulting from the photopolymerization, said plasticizer acting as a solvent for said photosensitizing agent and comprising the remainder of said liquid catalyst phase;

said composite restorative material being photopolymerizable to a hard, solid mass having a compressive strength greater than 30,000 p.s.i. to a depth of at least 1 mm. within a period of about 2 minutes when exposed to light energy of the above wave length and intensity, said monomer paste phase and liquid catalyst phase being mixed in a ratio of from about 10:1 to about 25:1.

13. The composite restorative material of claim 12 wherein said aromatic dimethacrylate monomer comprises a compound of the formula:

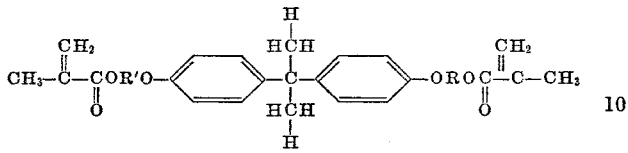

wherein R and R' are hydrocarbon chains of up to 10 carbon atoms, said hydrocarbon chains being optionally substituted with 1 or more groups selected from hydroxy and carbonyl.

14. The composite restorative material of claim 13 wherein said aromatic dimethacrylate monomer comprises 2,2'-propane bis[3(4-phenoxy)-1,2-hydroxy propane-1-methacrylate].

15. The composite restorative material of claim 13 wherein said aromatic dimethacrylate monomer comprises an adduct of hexamethylene diisocyanate and 2,2'-propane bis[3(4-phenoxy)-1,2-hydroxy propane-1-methacrylate].

16. A composite restorative material capable of polymerizing when exposed to light prepared by mixing a monomer jelly phase comprising:
(a) 38–60% by weight of a photopolymerizable aromatic dimethacrylate monomer of the formula:

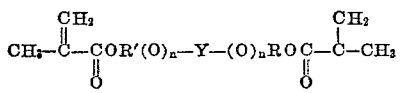

wherein Y is an aromatic group selected from phenylene, diphenylene and bridged phenylene of the formula:

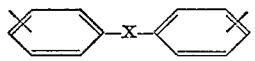

wherein X represents lower alkylene; R and R' are hydrocarbon chains of up to 10 carbon atoms, said hydrocarbon chains being optionally substituted with 1 or more groups selected from hydroxy and carbonyl; and $n$ is 1, or adduct thereof with an organic mono-, di- or triisocyanate, with the proviso that when (a) is said adduct, said aromatic dimethacrylate monomer contains at least 1 hydroxy group capable of reacting with said organic mono- di- or triisocyanate;
(b) 35–48% by weight of a diluent monomer comprising a polymerizable aliphatic methacrylate or dimethacrylate;
(c) 5–8% by weight of a vitreous particulate filler of an average particle size of less than about 10 microns, said filler having a refractive index differing from the polymer resulting from the photopolymerization by not more than 0.075; and (d) 100–500 p.p.m. of a polymerization inhibitor capable of inhibiting premature polymerization prior to exposure with ultraviolet light;
with a powder catalyst phase comprising:
(e) 3–10% by weight of a photosensitizing agent capable of initiating free radical polymerization of said photopolymerizable monomer or adduct and diluent monomer upon exposure to light energy of wave length greater than 3100 A. emitted from a source at an intensity equivalent to that from the center of a 40-watt high-pressure mercury arc lamp and transmitted through a 6" length of ¼" diameter UV transmitting quartz rod with an air gap of less than ½";
(f) 0–0.75% by weight of a free radical polymerization catalyst; and
(g) a vitreous particulate filler of an average particle size of less than about 10 microns, said filler having a refractive index differing from the polymer resulting from the photopolymerization by not more than 0.075, said filler comprising the remainder of said catalyst powder phase;
said composition restorative material being photopolymerized when exposed to light energy of the above wave length and intensity, said catalyst powder phase and monomer jelly phase being mixed in a ratio of powder to jelly of 2:1 to 3.5:1.

17. The composite restorative material of claim 16 wherein at least a portion of said vitreous particulate filler in said monomeric jelly phase is a submicron thickener.

18. The composite restorative material of claim 16 wherein in said monomer jelly phase, said aromatic dimethacrylate monomer comprises 2,2'-propane bis[3(4-phenoxy)-1,2-hydroxy propane-1-methacrylate].

19. The composite restorative material of claim 16 wherein in said monomer jelly phase, said aromatic dimethacrylate monomer comprises an adduct of hexamethylene diisocyanate and 2,2'-propane bis[3(4-phenoxy)-1,2-hydroxy propane-1-methacrylate].

References Cited
UNITED STATES PATENTS

| Number | Date | Name | Class |
|---|---|---|---|
| 3,551,246 | 12/1970 | Bassemir | 260—41 |
| 3,028,367 | 4/1962 | O'Brien | 260—77.5 |
| 2,558,139 | 6/1951 | Knock | 260—455 |
| 2,951,758 | 9/1960 | Notley | 96—35 |
| 3,515,656 | 6/1970 | Yun Huang | 204—159.22 |
| 3,539,533 | 11/1970 | Lee et al. | 260—47 |
| 2,779,751 | 1/1957 | Bredereek | 260—89.5 |
| 3,625,916 | 12/1971 | Newman | 260—41 A |

DONALD E. CZAJA, Primary Examiner

W. E. PARKER, Assistant Examiner

U.S. Cl. X.R.

32—14; 106—38.5 D; 214—159.23; 260—318, 41 R, 775 AP

UNITED STATES PATENT OFFICE
CERTIFICATE OF CORRECTION

Patent No. 3,709,866            Dated January 9, 1973

Inventor(s) Duncan E. Waller

It is certified that error appears in the above-identified patent and that said Letters Patent are hereby corrected as shown below:

Claim 16(a) delete:
"3860%"

and insert:
--38-60%--

Signed and sealed this 22nd day of May 1973.

(SEAL)
Attest:

EDWARD M. FLETCHER, JR.
Attesting Officer

ROBERT GOTTSCHALK
Commissioner of Patents